United States Patent [19]
Capper et al.

[11] 3,956,815
[45] May 18, 1976

[54] EXPLOSIVELY PROPELLED EQUAL MASS TUBULAR MEMBER SWAGING TOOL

[75] Inventors: Harry Milton Capper, Harrisburg, Pa.; William Franklin Broske, Myrtle Beach, S.C.

[73] Assignee: AMP Incorporated, Harrisburg, Pa.

[22] Filed: May 6, 1975

[21] Appl. No.: 574,980

[52] U.S. Cl. ............................ 29/421 E; 29/200 E; 29/254; 29/516; 29/525; 285/382.2; 403/274
[51] Int. Cl.² ..................................... B32P 17/00
[58] Field of Search ............ 29/421 R, 421 E, 254, 29/464, 525, 516, 237, 255, 200 E; 403/274, 278, 285; 285/370, 18, 382.2, 382.7

[56] References Cited
UNITED STATES PATENTS

| | | | |
|---|---|---|---|
| 3,341,650 | 9/1967 | Broske | 29/421 E X |
| 3,742,582 | 7/1973 | Broske | 29/421 E X |
| 3,759,551 | 9/1973 | Broske | 29/516 X |
| 3,848,451 | 11/1974 | Allin | 29/237 X |
| 3,872,707 | 3/1975 | Broske | 29/516 X |
| R26,685 | 10/1969 | Broske | 29/421 E X |

*Primary Examiner*—Victor A. DiPalma
*Attorney, Agent, or Firm*—Russel J. Egan

[57] ABSTRACT

An improved tool is disclosed for joining the adjacent ends of pipes, conduits, and like tubular members through the use of explosively propelled swaging members. The tool includes a jacket assembly defining a closed chamber having a die at one end thereof and a die assembly which is received in the chamber. Both the die assembly and jacket assembly are substantially cylindrical to encompass end portions of the tubular members to be joined. The masses of the die assembly and of the jacket assembly are substantially equal so that, when the explosive propellant is ignited, they travel at substantially equal speeds in opposite directions with the die faces travelling towards one another to effect a swaging of a sleeve connector on the respective ends of the tubular members or bell configuration of one member onto a straight end of the adjacent member.

16 Claims, 6 Drawing Figures

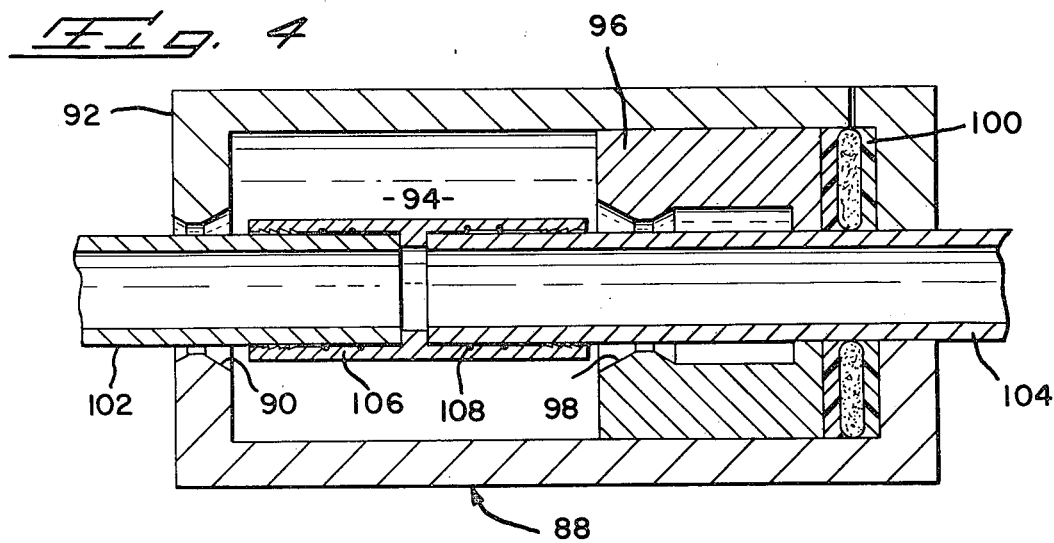
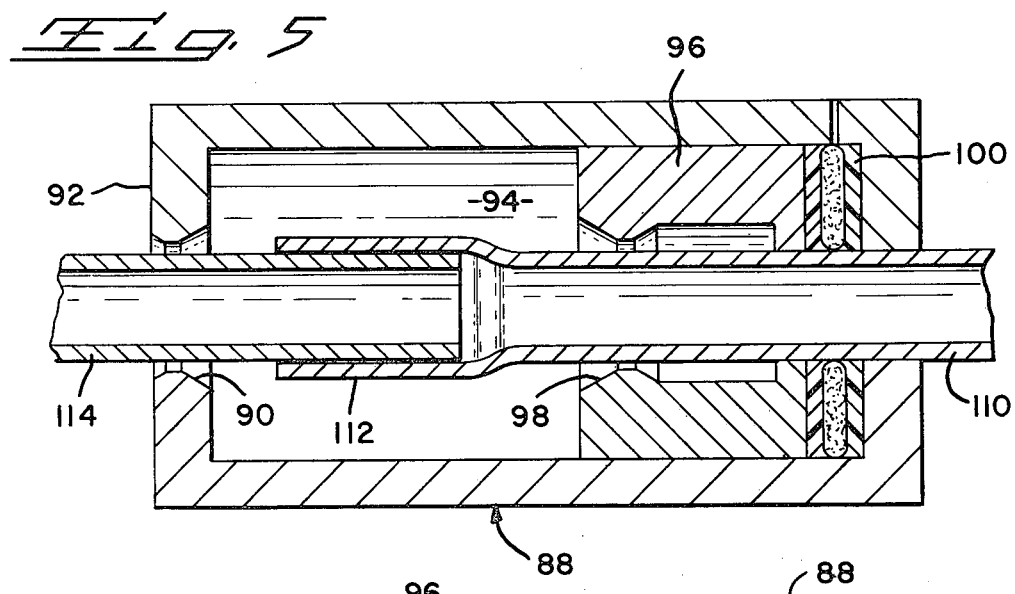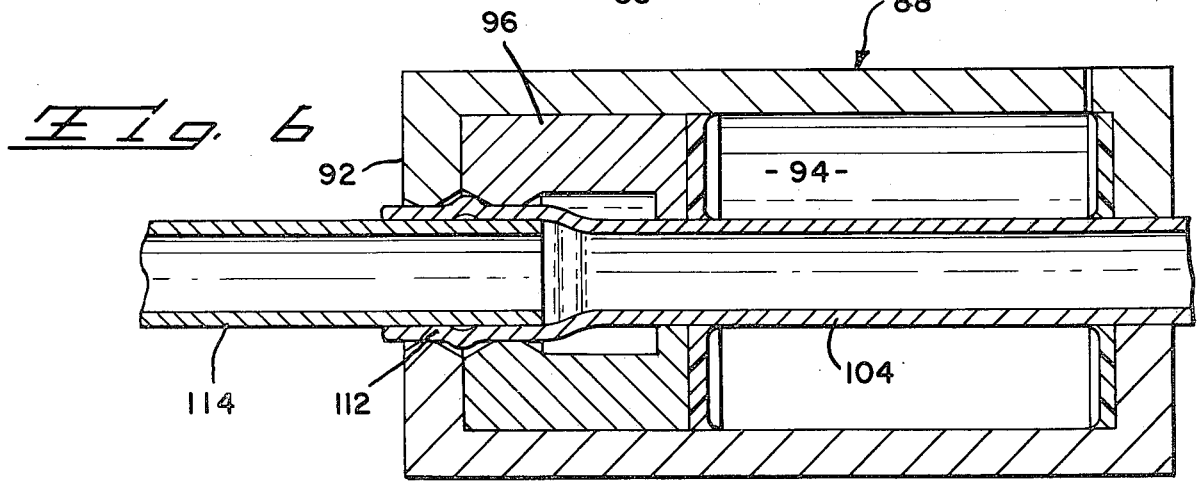

EXPLOSIVELY PROPELLED EQUAL MASS TUBULAR MEMBER SWAGING TOOL

BACKGROUND OF THE INVENTION

The Field Of The Invention

The present invention relates to an improved explosively actuated tool for joining tubular members, such as pipes, conduits and the like, and in particular to a tool having a jacket assembly and a die assembly of substantially equal masses.

The Prior Art

The present invention represents an improvement in the art of explosively actuated tools for performing cold forge joining of tubular members such as pipes, conduits, and the like. The prior art is best represented by U.S. Pat. Nos.: Re 26,685; 3,341,650; 3,742,582; 3,759,551; and 3,872,707.

The present invention can be employed to join tubular members, such as pipes, up to twelve inches or more in diameter. Previously welding has been required in order to join members of such size in a sufficiently fluid tight manner. Such welding procedures are frequently undesirable since the cost of labor is high and it is often difficult to weld large size pipes, etc., in the field. The environment where the welding is to take place also must be considered. For example, the pipe lines presently being constructed in the arctic region create a situation where it is undesirable to have men exposed to weather for the long periods required by normal welding procedures.

In order to overcome the difficulties encountered in the past in welding pipes together, equipment has been provided, according to the prior art, for swaging pipes together. Much of this equipment is hydraulically operated and employs double acting cylinders to obtain a reverse stroke of the swaging means, since the pipes have a tendency to spring back in the radial direction after swaging and thereby tending to loosen the swaged joint. The large size required for such hydraulic equipment considerably limits the manuverability and portability thereof. The hydraulic equipment is additionally quite expensive. Furthermore, the size of the pipe which can be handled by such equipment is limited by the machinery that is available.

SUMMARY OF THE INVENTION

The present invention obviates much of the above-mentioned difficulty in joining tubular members and constitutes an improvement over the noted prior art devices by forming an explosively actuated swaging tool having two main components of substantially equal masses. The present invention can be used to form a fluid tight connection between adjacent tubular members by swaging a collar or sleeve member simultaneously to the adjacent free ends of both tubular members or swage a bell on the end of one member to the end of the other member, which end is received within the bell. Two main components of the tool include a jacket assembly defining a chamber therein with a first die face at one end thereof and a die assembly moveable within the chamber with a second die face in opposition to the first die face. Both assemblies are arranged to be opened, in order to be mounted on and removed from elongated tubular members, and are explosively driven at substantially equal speed in opposite directions with the respective die faces moving towards each other to swage the tubular members together via a sleeve receiving both members or a bell on one member receiving the other member therein. This type of operation, of course, completely eliminates the necessity for welding the tubular members together by the previously well known methods of oxyacetylene or electric arc welding.

It is therefore an object of the present invention to produce a compact and highly portable tool which can be used to economically and effectively join together tubular members in a fluid tight fashion.

Another object of the present invention is to produce an explosively propelled tool which is capable of swaging a collar or sleeve member onto adjacent free ends of tubular members of relatively large size, the joint thus formed being fluid tight.

Still another object of the present invention is to provide an improved explosively actuated tool for effecting connection of tubular members in a fluid tight manner and which tool eliminates the necessity of welding the units with conventional oxyacetylene or electric arc welding equipment.

Yet another object of the present invention is to produce an improved explosively actuated tool for mechanically connecting tubular members in a fluid tight manner by a swaging operation and which tool eliminates the previously employed bulky and expensive hydraulic equipment.

It is a further object of the present invention to produce a tool which can be employed to cold swage tubular members together in a fluid tight fashion with great economy and ease of operation.

It is a still further object of the present invention to provide a tool for swaging together the free ends of tubular members in a fluid tight fashion via a sleeve receiving both free ends therein or a bell on one free end receiving the other free end therein.

The means for accomplishing the foregoing objects, and other advantages of the present invention, will be apparent from the following detailed description taken with reference to the accompanying drawings.

BRIEF DESCRIPTION OF THE DRAWINGS

FIG. 4 is a longitudinal section through a first alternate embodiment of the subject tool readied to join two tubular members by means of a sleeve;

FIG. 5 is a longitudinal section through the first alternate embodiment of the invention readied to join two tubular members, one of which has a bell receiving the free end of the other member therein; and FIG. 6 is a view similar to FIG. 5 showing the tool after actuation.

DETAILED DESCRIPTION OF THE PREFERRED EMBODIMENT

Figure 1:
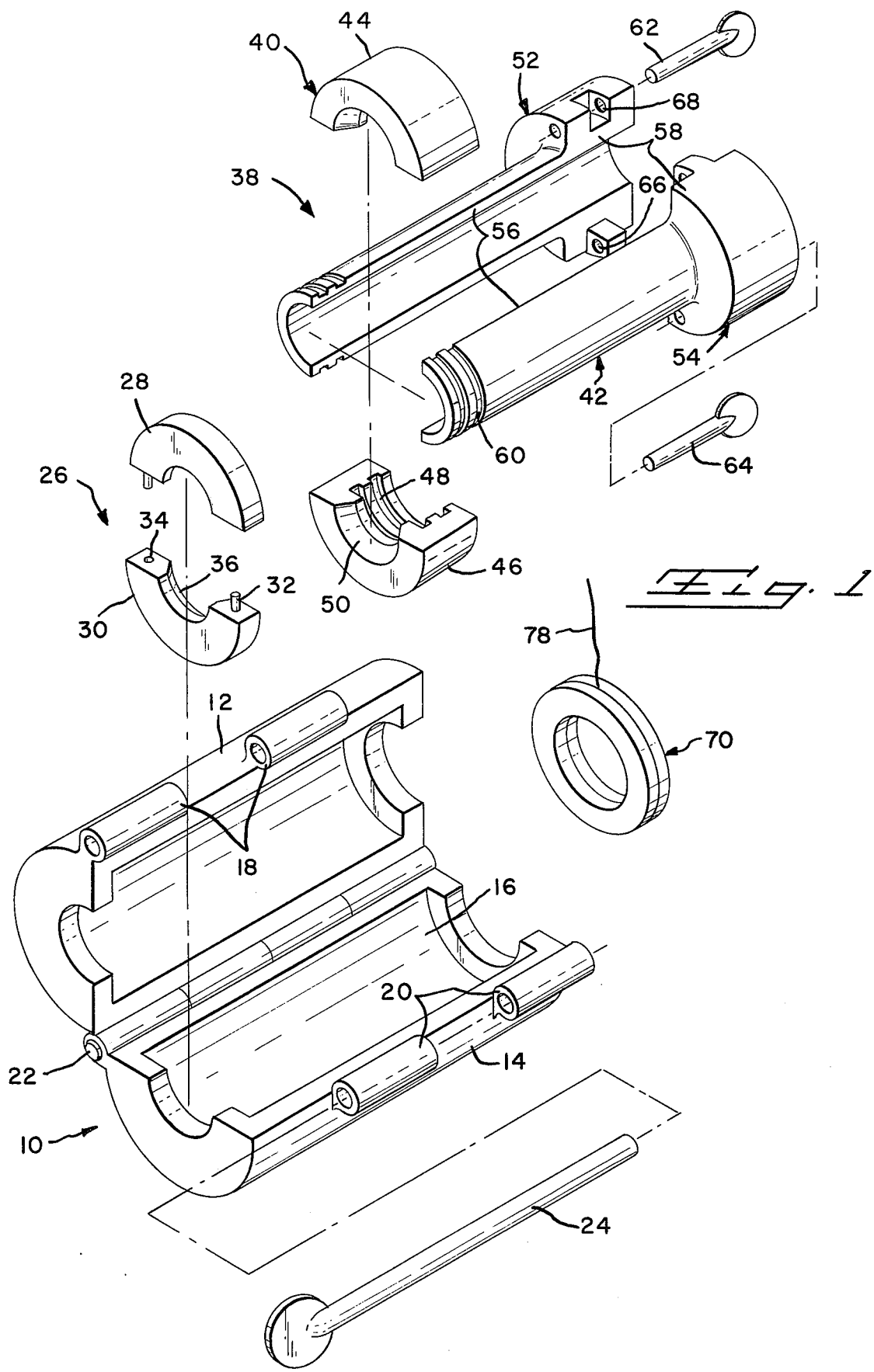
FIG. 1 is an exploded perspective view of a first embodiment of the subject tool.
Figure 2:
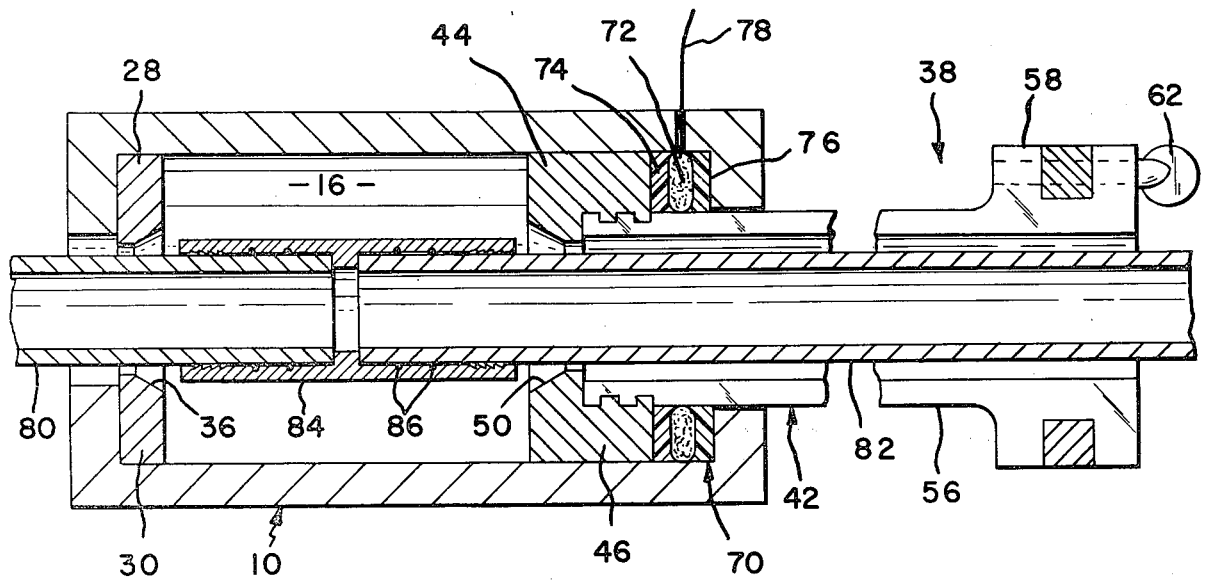
FIG. 2 is a longitudinal section through the tool of FIG. 1 shown prior to swaging the tubular members together.
Figure 3:
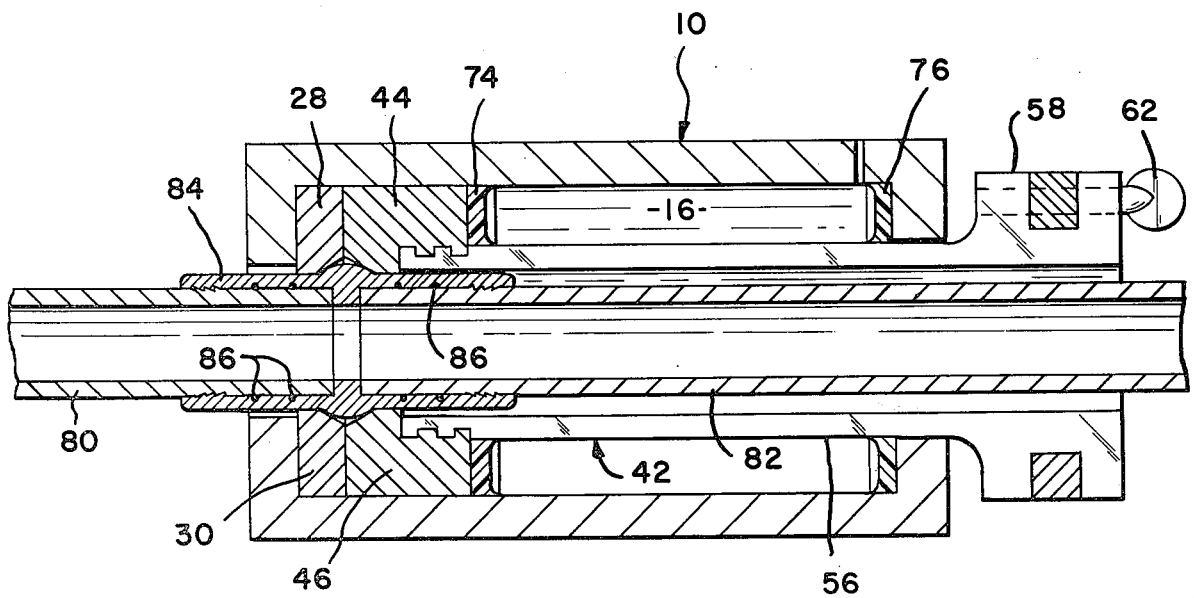
FIG. 3 is a view similar to FIG. 2 showing the subject tool after swaging the tubular members together.

The preferred embodiment of the subject equal mass swaging tool is shown in FIGS. 1 to 3 and comprises two main assemblies of substantially equal mass. The tool jacket assembly 10 includes identical housing members 12, 14 which together define a chamber 16 therein. Each housing member 12, 14 has at least two integral first hinge sockets 18 spaced along a first side and a like number of integral second hinge sockets 20 on the opposite sides thereof. The first and second hinge sockets 18, 20 are longitudinally offset in order to be aligned to receive therein a pivot pin 22, for hingedly securing the housing members together, and a removable locking pin 24, for securing the housing members together in a closed condition. A first die member 26 is received in one end of the chamber and comprises first and second arcuate members 28, 30. The members 28, 30 are identical and have alignment pins 32 and recesses 34 on opposing portions thereof. Together the members 28, 30 define a die face 36 which is directed inwardly of the jacket assembly. The members 28, 30 are held together by the closed housing members 12, 14.

The die assembly 38 includes a second die 40 and a counter weight 42. The second die 40 includes identical arcuate members 44, 46, each having a plurality of inwardly directed grooves 48 and together defining a profiled die face 50. The counter weight 42 comprises mating members 52, 54 which together define a cylindrical protion 56 and an integral mass portion 58. The cylindrical portion 56 has a plurality of outwardly directed grooves 60 adjacent its free end and in which the inwardly directed grooves 48 of die members 44, 46 engage. The members 52, 54 are joined together at the mass portion 58 by removable pins 62, 64 inserted in bores 66, 68. Thus the entire die assembly 38 can be opened and disassembled from the joined tubular members with relative ease.

The tool further includes a propellant unit 70 which includes a charge of explosive material 72 mounted within a pair of annular seals 74, 76 and with detonating means 78 extending therefrom.

The assembly and operation of the subject tool will be described with reference to FIGS. 2 and 3 and in which conduits or tubular members 80, 82 are to be joined by a connector sleeve 84. The sleeve may be provided with inner annular seals 86 to assure containment of materials flowing through members 80, 82. It should also be understood that a bell ended tubular member may be used, as will be explained later with reference to an alternate embodiment of the subject tool shown in FIGS. 5 and 6. The propellant charge 70 is slipped over the end of tubular member 82 and the adjacent ends of the tubular members 80, 82 are inserted into opposite ends of the sleeve 84. The first die 26 is then assembled about tubular member 80 with the swaging die face 36 directed towards the connector sleeve 84. The counter weight assembly 42 is assembled about the second tubular member 82 with the cylindrical portion 56 extending through the central aperture of the propellant charge 70. The counter weight assembly members 52, 54 are joined together by the respective pins 62, 64 and the second die member 40 is assembled on the counter weight assembly by engaging the grooves 48 in the corresponding grooves 60 of the counter weight assembly. The entire counterweight assembly and first die are then enclosed by the jacket assembly 10 which is locked in the closed condition by insertion of the removable pin 24. The tool is thus mounted on the tubular members in the condition as shown in FIG. 2.

The propellant charge 70 is fired, in a conventional manner, with the resulting force driving the jacket assembly and counterweight assembly in opposite directions and with substantially the same speed. The mass of the jacket assembly 10 and the first die 26 is substantially equal to the mass of the counter weight assembly 38 and the second die 40 so that the respective die faces travel towards each other substantially equal distances while swaging the sleeve 84 against the tubular members 80, 82 as shown in FIG. 3.

The tool is dismounted from the joined tubular members by removing pin 24 and opening the jacket assembly 10, disassembling the first die 26, the second die 40, and the counter weight assembly 42. The only members remaining on the joined tubular members are the annular seal portions 70, 72 of the propellant charge. These seals are expendable and can be simply broken away or left in place, if there is no particular need to remove them.

It should be noted that only the dies 26 and 40 actually contact the sleeve or bell that is being swaged. Thus it is simply a matter of changing these dies to accommodate tubular members having a wide range of diameters. All of the dies would have the same external dimensions while each set of a pair of dies would have a different internal dimension defining the swaging die face. Of course, if the tool is intended for use over an extremely large range of diameters, then it would be necessary to have a stepped or sized set of jacket assemblies and corresponding counterweight assemblies in order to achieve efficient operation of the tool. It should also be appreciated that the propellant charge would be changed in accordance with the respective masses and the material being swaged.

Turning now to the first alternate embodiment, the tool comprises a jacket assembly 88, which is formed by two hingedly connected members in the manner of jacket assembly 10. However, contrary to jacket assembly 10, a first die face 90 is formed integrally with one end 92 of the jacket assembly 88 inwardly directed toward the chamber 94 defined by the assembly 88. The second die 96 is made of a high density material and has a die swaging face 98 formed integrally therewith. The propellant means 100 is substantially the same as the previously discussed propellant charge.

This tool is assembled on the tubular members 102, 104, which are to be joined by a sleeve type connector 106 having inner annular seals 108, much in the same manner as the previously described preferred embodiment. The propellant charge 100 is slipped over the end of tubular member 104 prior to inserting the ends of the members into the connector sleeve 106. The second die 96 is assembled about the tubular member 104 and the jacket assembly 88 is assembled about the propellant charge 100, second die 96, and both tubular members 102, 104. Upon detonation of the propellant charge 100 the die 96 is driven in the opposite direction with respect to the jacket assembly 88 so that the swaging die surfaces 90, 98 engage and deform the sleeve connector 106 thus forming an intimate mechanical joint between the sleeve connector and the respective tubular members. Again the annular seals 108 can be provided to assure the fluid integrity of the joint.

The alternate embodiment of the subject tool is shown in FIGS. 5 and 6 as it would be used to swage together a tubular member 110 having a belled end 112 receiving a second tubular member 114 therein. In this instance the tubular member 114 has a straight end while tubular member 110 has a bell-shaped end 112 of sufficient diameter to receive therein the end of tubular member 114. Thus this embodiment obviates the need for the sleeve connector discussed with respect to the previous embodiments. The actuation of the alternate embodiment of the subject tool is shown in FIGS. 5 and 6 and is the same as with respect to FIG. 4, the bell 112 being deformed against tubular member 114 to effectively swage the two together.

The present invention may be subject to many modifications and changes without departing from the spirit or essential characteristics thereof. The present embodiments are therefore intended in all rspects to be merely illustrative and not restrictive of the scope of the invention.

What is claimed is:

1. A method for cold-forging together a first tubular member and a second tubular member, an end portion of said first tubular member being disposed within an end portion of said second tubular member, through both a radially inward swaging and a longitudinal extrusion of said second tubular member, comprising the steps of:

mounting on one of said tubular members a countermass assembly including a pair of like members detachably secured together an defining a first annular die on one end thereof, said annular die being directed toward the other of said tubular members;

mounting a propellant means on said one of said tubular members adjacent the other end of said countermass assembly;

enclosing said countermass assembly and propellant means in a shell assembly having substantially equal mass with said countermass assembly and including two members detachably secured together to define therebetween a cylindrical chamber having first and second ends adapted to fit over the adjoining free ends of the first and second tubular members and second annular die means at one end of said chamber in spaced opposition to said first die; and igniting said propellant means whereby said shell assembly and said countermass means are driven in opposite directions and at substantially equal speed so that said dies engage and effect a swaging action to join said first and second tubular members together.

2. A method according to claim 1 wherein said first tubular member comprises a pair of like tubular members having aligned, closely spaced adjacent free ends, and said second tubular member comprises a cylindrical sleeve receiving said free ends in the opposite ends thereof.

3. A method according to claim 1 further comprising at least one annular interior seal in said sleeve.

4. A method according to claim 1 wherein said second tubular member has a bell-shaped free end, and said first tubular member has a straight free end received within said bell.

5. A method according to claim 1 further comprising at least one annular seal within said bell.

6. An explosively propelled tool for mechanically joining first and second tubular members by swaging, which tool comprises:

a. a shell assembly defining a chamber having first and second ends adapted to fit over the adjoining free ends of the first and second tubular members, means at said first end defining an annular first die means;

b. a counterweight assembly mounted in and confined to linear motion by the chamber, said counterweight assembly including second annular die means encircling one of said tubular members and directed inwardly of said chamber, said counterweight assembly and said shell assembly having substantially equal masses;

c. propellant means positioned between the counterweight assembly and the second end of said chamber which, when ignited, drives the shell assembly and the counterweight assembly longitudinally along said tubular members with substantially equal speed in opposite directions so that said dies cause both a radially inward swaging and a longitudinal extrusion of said second tubular member.

7. A tool according to claim 6 wherein said first tubular member comprises a pair of like tubular members having aligned, closely spaced adjacent free ends, and said second tubular member comprises a cylindrical sleeve receiving said free ends in the opposite ends thereof.

8. A tool according to claim 6 further comprising at least one annular interior seal in said sleeve.

9. A tool according to claim 6 wherein said second tubular member has a bell-shaped free end, and said first tubular member has a straight free end received within said bell.

10. A tool according to claim 6 further comprising at least one annular seal within said bell.

11. A tool according to claim 6 wherein said shell assembly comprises:

a pair of like housing members detachably secured together.

12. A tool according to claim 11 wherein said first annular die means is a split die each portion of which is integral with a respective one of said housing members.

13. A tool according to claim 11 wherein said first annular die means comprises:

a pair of identical arcuate members which together define an annular die face, and means for aligning said arcuate members with respect to each other.

14. A tool according to claim 6 wherein said countermass assembly comprises:

a pair of like members which together define a tubular portion and an integral countermass portion, means for detachably securing said members together, and said second annular die means comprising a pair of arcuate members detachably secured to the free end of said tubular portion.

15. A tool according to claim 14 wherein said tubular portion is of sufficient length to allow said countermass portion to project beyond the end of said shell assembly.

16. A tool according to claim 14 further comprising:

a plurality of projections and recesses on said tubular portion and said arcuate members of said second annular die means whereby said second annular die means is secured to said tubular portion for movement therewith.

* * * * *